US012294153B2

(12) United States Patent
Lou et al.

(10) Patent No.: US 12,294,153 B2
(45) Date of Patent: May 6, 2025

(54) ARRAY ANTENNA

(71) Applicant: QuantumZ Inc., Kaohsiung (TW)

(72) Inventors: Chih-Yang Lou, Kaohsiung (TW); Meng-Hua Tsai, Kaohsiung (TW); Wei-Ting Lee, Kaohsiung (TW); Sin-Siang Wang, Kaohsiung (TW)

(73) Assignee: QUANTUMZ INC., Kaohsiung (TW)

( * ) Notice: Subject to any disclaimer, the term of this patent is extended or adjusted under 35 U.S.C. 154(b) by 351 days.

(21) Appl. No.: 17/972,558

(22) Filed: Oct. 24, 2022

(65) Prior Publication Data

US 2023/0231320 A1 Jul. 20, 2023

(30) Foreign Application Priority Data

Jan. 18, 2022 (TW) .................................. 111102009

(51) Int. Cl.

| | |
|---|---|
| ***H01Q 21/06*** | (2006.01) |
| ***H01Q 1/08*** | (2006.01) |
| ***H01Q 9/04*** | (2006.01) |
| ***H01Q 13/08*** | (2006.01) |

(52) U.S. Cl.

CPC ........... *H01Q 21/065* (2013.01); *H01Q 1/085* (2013.01); *H01Q 9/0407* (2013.01); *H01Q 13/08* (2013.01)

(58) Field of Classification Search

CPC .... H01Q 21/065; H01Q 1/085; H01Q 9/0407; H01Q 13/08

See application file for complete search history.

(56) References Cited

FOREIGN PATENT DOCUMENTS

| | | |
|---|---|---|
| CN | 109728431 | 5/2019 |
| CN | 112421207 | 2/2021 |
| WO | 2013140036 | 9/2013 |
| WO | 2020187983 | 9/2020 |

*Primary Examiner* — Graham P Smith

(74) *Attorney, Agent, or Firm* — Leong C. Lei

(57) ABSTRACT

An array antenna includes a flexible substrate formed by stacked liquid crystal polymer (LCP) layers and has at least one feed point. At least one serial antenna is arranged on the flexible substrate, and a microstrip is extended from the feed point to connect a plurality of radiating elements in series to form the serial antenna. The tail end one of the radiating elements of the serial antenna is connected to one end of a ground microstrip, and another end of the ground microstrip is short-circuited to the ground. The length of the ground microstrip is approximately one fourth of the wavelength of the center frequency of the array antenna. Feeding sections where microstrips feeding to the radiating elements are in a horn and/or groove shape. Desired frequency and bandwidth may be obtained by adjusting lengths and widths of feeding sections respectively.

18 Claims, 5 Drawing Sheets

ARRAY ANTENNA

CROSS-REFERENCE TO RELATED APPLICATION

This application claims the benefit of Taiwan Patent Application No. 111102009, filed on Jan. 18, 2022, which is hereby incorporated by reference for all purposes as if fully set forth herein.

BACKGROUND

Technical Field

The present invention relates to an array antenna, and particularly to a millimeter wave array patch antenna.

Related Art

In order to reduce sidelobe gains of an array antenna, conventional millimeter wave antennas are arranged in series and/or in parallel. Sidelobes are lowered by changing the width ratios of the radiating elements or changing the power distribution ratios. However, such ratios require algorithm calibrations, so that the lowered sidelobes may be optimized, but it is difficult to fine-tune in different parts.

SUMMARY

One objective of the present invention is to provide an array antenna, where the frequency bandwidth and center frequency may be adjusted by adjusting the length of the feeding section of microstrip feeding to the radiating element.

Another objective of the present invention is to provide an array antenna, where the length of the ground microstrip at the tail end of a radiating element may be adjusted and thereby effectively reducing sidelobe gains.

Yet another objective of the present invention is to provide an array antenna, where a serial antenna and a parallel antenna may be used simultaneously, and feeding sections of microstrip feeding to the radiating elements are in a horn shape and a groove shape. Desired frequency and bandwidth may be obtained by respectively adjusting lengths and widths of the feeding sections.

In order to achieve the foregoing objectives, the present invention provides an array antenna including a flexible substrate formed by a plurality of stacked liquid crystal polymer (LCP) layers with at least one feed point, and at least one serial antenna arranged on the flexible substrate. A microstrip is extended from the feed point and connects a plurality of radiating elements in series to form the serial antenna. The last one of the radiating elements in the serial antenna farthest from the feed point is connected to one end of the ground microstrip, and another end of the ground microstrip is short-circuited to the ground. The length of the ground microstrip is approximately one fourth of the wavelength of the center frequency of the array antenna.

Another aspect of the present invention provides an array antenna including a flexible substrate formed by a plurality of stacked LCP layers with at least one feed point. At least one power splitter is arranged on the flexible substrate and extended from the feed point, and splits into a plurality of branch feeders. At least one parallel antenna is arranged on the flexible substrate, where the parallel antenna has a plurality of parallel radiating elements respectively connected to the corresponding branch feeders by microstrips.

Tail ends of the radiating elements are respectively connected to ends of ground microstrips, another ends of the ground microstrips are short-circuited to the ground, and a length of the ground microstrip is approximately one fourth of the wavelength of the center frequency of the array antenna.

Yet another aspect of the present invention provides an array antenna including a flexible substrate formed by a plurality of stacked LCP layers and having at least one feed point. At least one power splitter is arranged on the flexible substrate, extended from the feed point, and splits into a plurality of branch feeders. At least one parallel antenna is arranged on the flexible substrate, where the parallel antenna has a plurality of parallel radiating elements respectively connected to the corresponding branch feeders by microstrips. The microstrips are respectively extended to connect the plurality of radiating elements in series to form a plurality of serial antennas. A tail end of one of the radiating elements in the serial antennas farthest from the feed point is connected to one end of a ground microstrip, another end of the ground microstrip is short-circuited to the ground, and the length of the ground microstrip is approximately one fourth of the wavelength of the center frequency of the array antenna.

Further, a horn shaped feeding section is added to the microstrip feeding to each radiating element of the serial antenna. The width of the horn shaped feeding section is larger than a width of the microstrip, so that the array antenna may achieve a better frequency response by adjusting the matching condition of each radiating element.

Further, the microstrips of the parallel antenna present groove shaped feeding sections connecting to the radiating elements.

Further, lengths of the horn shaped feeding sections are adjustable, so that the array antenna may achieve a better frequency response by adjusting the matching condition of each radiating element.

Further, the distance between centers of two adjacent radiating elements is approximately equal to the wavelength of the center frequency of the array antenna.

Further, the length of each of the radiating elements in a direction of the microstrips is approximately half of the wavelength of the center frequency of the array antenna, and the optimal matching effect may be achieved.

Further, two sets of array antennas are substantially perpendicular to each other when used simultaneously.

Further, the microstrip forms a horn shaped feeding section in the microstrip feeding to each of the radiating elements, and the lengths of the feeding sections may be different.

The array antenna of the present invention has the following advantages: with a reduced number of patches, a horn shaped feeding section is added to each radiating element of the array antenna. The horn shaped feeding section may adjust the matching condition of each radiating element, so that the array antenna may achieve a better frequency response. In addition, a ground microstrip is connected at an end of the array antenna and is short-circuited to the ground. Through adjusting the distance between the radiating element at the end and the short-circuit ground, the matching of the array antenna and the center frequency of the optimal response may be achieved, and the sidelobe gains may be further reduced.

DETAILED DESCRIPTION

Figure 1:
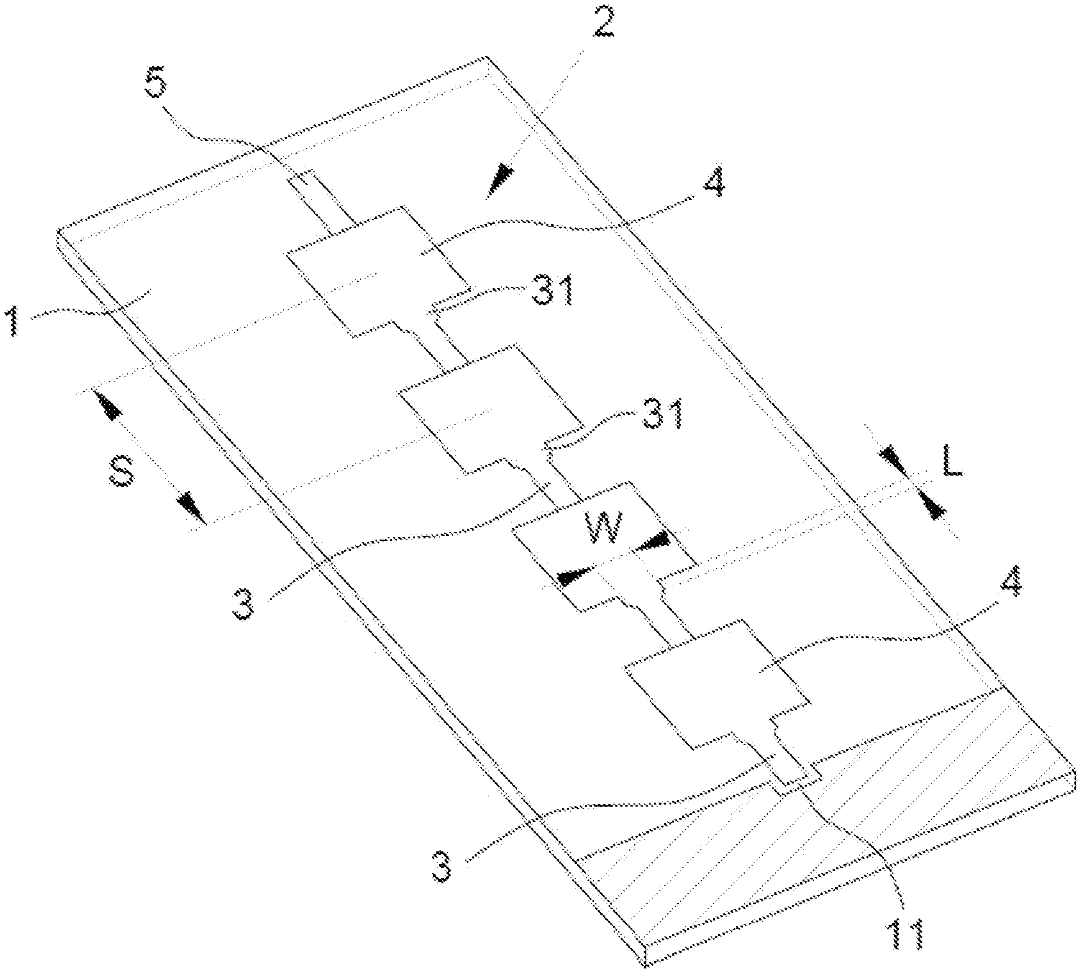
FIG. 1 is a schematic architecture diagram of a serial antenna of a first embodiment of an array antenna according to the present invention.

Embodiments of the present invention are described in detail below with reference to the accompanying drawings. The accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the type, quantity, and proportion of the components may be changed, and the layout of the components may be more complicated.

The following description of various embodiments is provided to exemplify the specific embodiments for implementation of the present invention with reference to accompanying drawings. The directional terms mentioned in present invention, like “above”, “below”, “front”, or “back”, refer to the directions in the accompanying drawings. Therefore, the used direction terms are intended to describe and understand the present invention, but are not intended to limit the present invention. In addition, in the specification, unless explicitly described as contrary, the word “include” is understood as referring to including the element, but does not exclude any other elements.

Referring to FIG. 1, a first embodiment of an array antenna according to the present invention. The array antenna includes a flexible substrate 1 and at least one serial antenna 2. The serial antenna 2 is arranged on the flexible substrate 1. In this embodiment, the array antenna is in a serial configuration.

The flexible substrate 1 is formed by a plurality of stacked liquid crystal polymer (LCP) layers and has at least one feed point 11. In this embodiment, the quantity of the LCP layers is at least three.

The serial antenna 2 is arranged on the flexible substrate 1, and microstrips 3 are extended from the feed point 11 to connect a plurality of radiating elements 4 in series to form the serial antenna 2. In this embodiment, the length of each of the radiating elements 4 in a direction of the microstrips 3 is approximately half (½λg) (±20%) of the wavelength of the center frequency of the array antenna, and the distance S between centers of two adjacent radiating elements 4 is approximately equal to the wavelength (λg) of the center frequency of the array antenna. The wavelength of the center frequency of the array antenna is 7.2 mm in this embodiment. In addition, each of the radiating elements 4 is a rectangular metal, or may be in other shapes such as square, circle, oval . . . etc., and not limited thereto.

A horn shaped feeding section 31 is arranged on each of the microstrips 3 in a feeding section of the each radiating element 4. Feeding sections 31 with the same or different widths are arranged where the microstrips 3 respectively connecting each radiating element 4. The width W of each feeding section 31 is greater than the width of the microstrip 3, and the length L of each feeding section 31 is adjustable. In this embodiment, an adjustment of the length L ranges from −0.3 mm to 0.5 mm and the lengths L may be all the same, partly the same, or all different. Negative values in the lengths L indicate that the lengths L are shortened, and positive values in the lengths L indicate that the lengths L are increased. Therefore, by adjusting the width W and/or the length L of the feeding section 31 of the each radiating element 4, the matching and center frequency of the array antenna may be adjusted.

Figure 2:
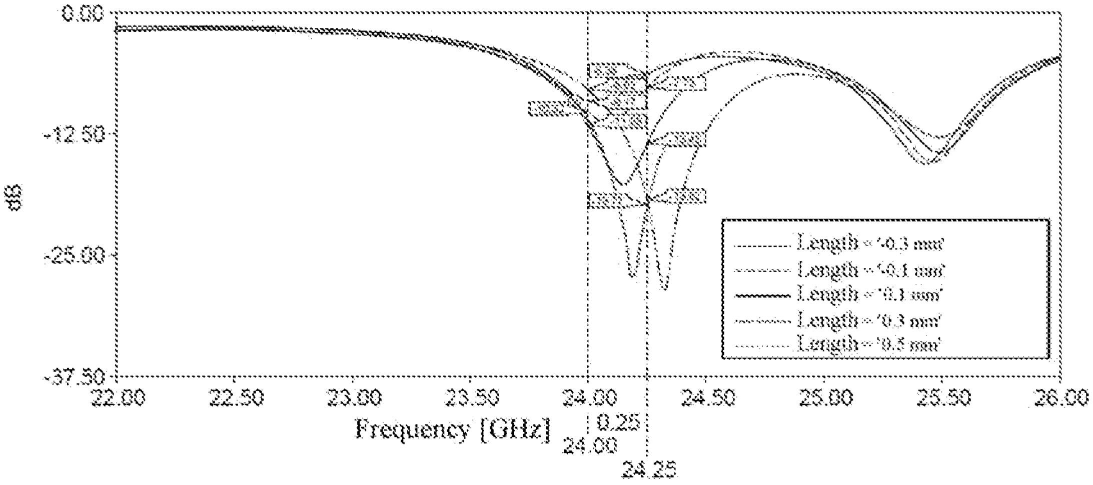
FIG. 2 is a frequency response diagram of length variations of horn shaped feeding sections of an array antenna according to the present invention.
Figure 3:
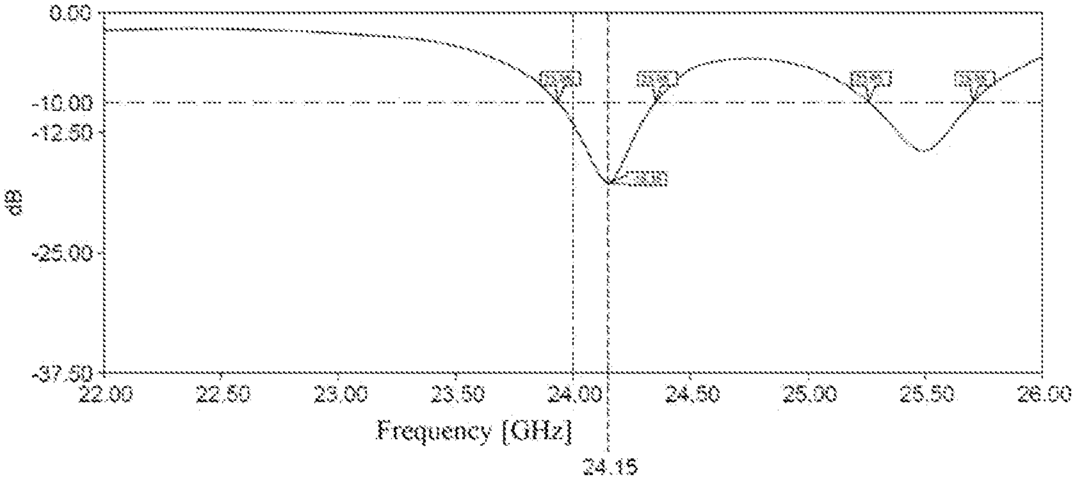
FIG. 3 is a preferred frequency response diagram after lengths of the switching and feeding sections are adjusted in FIG. 2.

Referring to FIG. 2, when the quantity of the radiating elements 4 of the array antenna is four, the width W of each feeding section 31 is 1.26 mm, and the lengths L of the feeding sections 31 are −0.3 mm, −0.1 mm, 0.1 mm, 0.3 mm, and 0.5 mm in sequence from a position closest to the feed point 11 in this embodiment. The array antenna may obtain an optimal frequency response, so that the center frequency of the array antenna is changed from 24 GHz to 24.15 GHz.

Figure 4:
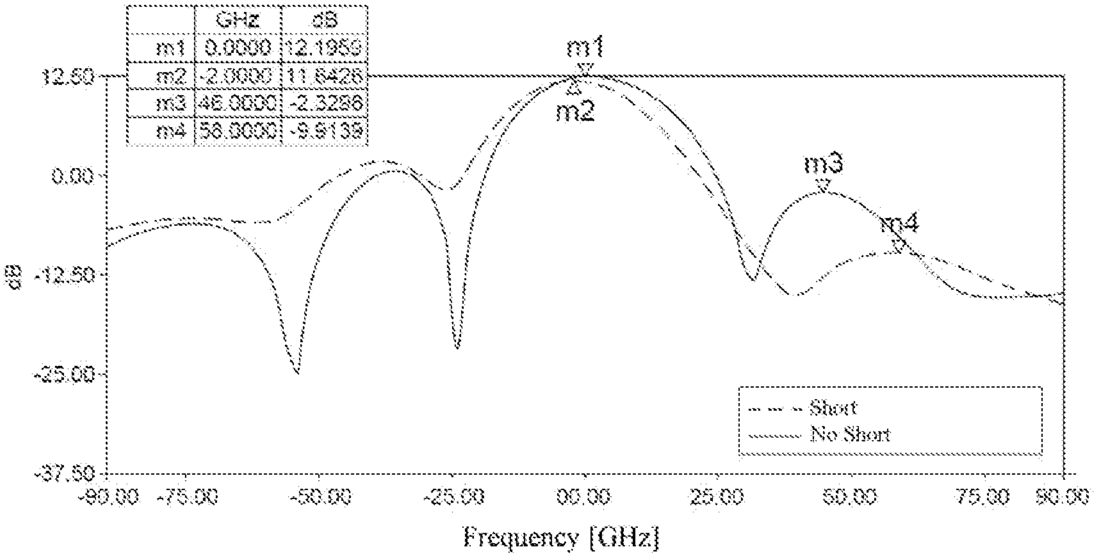
FIG. 4 is a 2D field pattern of ground microstrips short-circuited to the ground or not short-circuited to the ground according to the first embodiment of the present invention.

Referring to FIG. 1 and FIG. 4, the radiating element 4 farthest from the feed point 11 in the serial antenna 2 is connected to one end of a ground microstrip 5, and another end of the ground microstrip 5 is short-circuited to the ground. The ground microstrip 5 may be grounded with a via hole to achieve a short-circuit effect. Through adjusting the distance between the radiating element 4 at the end and the short-circuit ground, the matching of the array antenna and the center frequency of the optimal response may be achieved, and the sidelobe gains may be reduced. In this embodiment, the length of the ground microstrip 5 is approximately one fourth (¼λg) (±20%) of the wavelength of the center frequency of the array antenna. Compared to the existing serial antenna without the ground microstrip short-circuited to the ground, center frequencies (m1 and m2) of the array antenna with the ground microstrip 5 short-circuited to the ground are shifted by 2 GHz towards lower frequencies, and sidelobes (m3 and m4) are reduced by 7.5841 dB.

Figure 5:
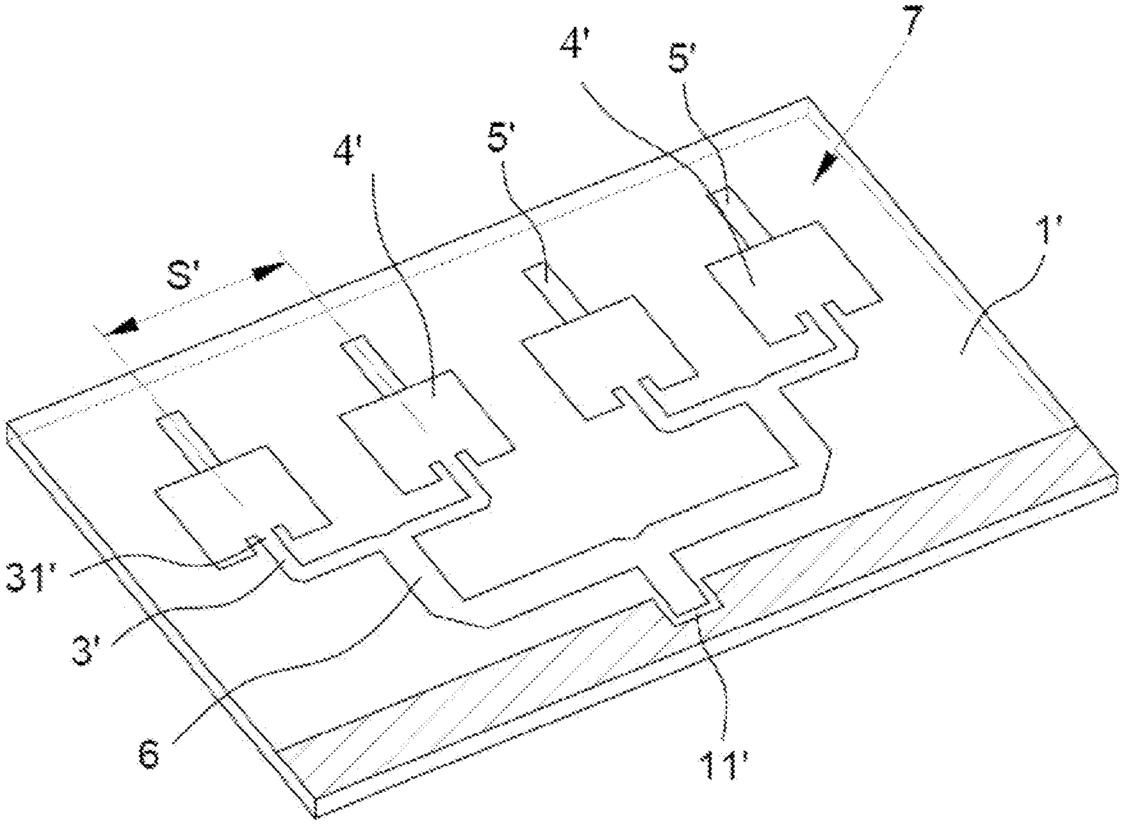
FIG. 5 is an architecture diagram of a parallel antenna of a second embodiment of an array antenna according to the present invention.

Referring to FIG. 5, the second embodiment of the array antenna according to the present invention. The array antenna includes a flexible substrate 1', at least one power splitter 6, and at least one parallel antenna 7. The power splitter 6 and the parallel antenna 7 are arranged on the flexible substrate 1'. In this embodiment, the array antenna is in a parallel configuration.

The flexible substrate 1' is formed by stacked LCP layers and has at least one feed point 11'. In this embodiment, the quantity of the LCP layers is at least three.

The power splitter 6 is arranged on the flexible substrate 1'. The power splitter 6 extends from the feed point 11' and splits into a plurality of branch feeders 3'. In this embodiment, the power splitter 6 is a microstrip four-way power splitter. The power splitter is common knowledge in related fields and the details will not be described here.

The parallel antenna 7 is arranged on the flexible substrate 1'. The parallel antenna 7 includes a plurality of parallel radiating elements 4' respectively connected to branch feeders of the corresponding power splitter 6 by microstrips 3'.

In this embodiment, the length of each of the radiating elements 4' in a direction of the microstrips 3' may be half (½λg) (±20%) of the wavelength of the center frequency of the array antenna, and the distance S' between centers of two adjacent radiating elements 4' is approximately equal to the wavelength (λg) of the center frequency of the array antenna. In this embodiment, the wavelength of the center frequency of the array antenna is 7.2 mm.

In addition, each of the radiating elements 4' is a rectangular metal, or may be made of other materials and in other shapes such as square, circle, oval . . . etc. and not limited thereto. The feeding section 31' formed in the feeding section of the each radiating element 4' is in the shape of a groove.

Figure 6:
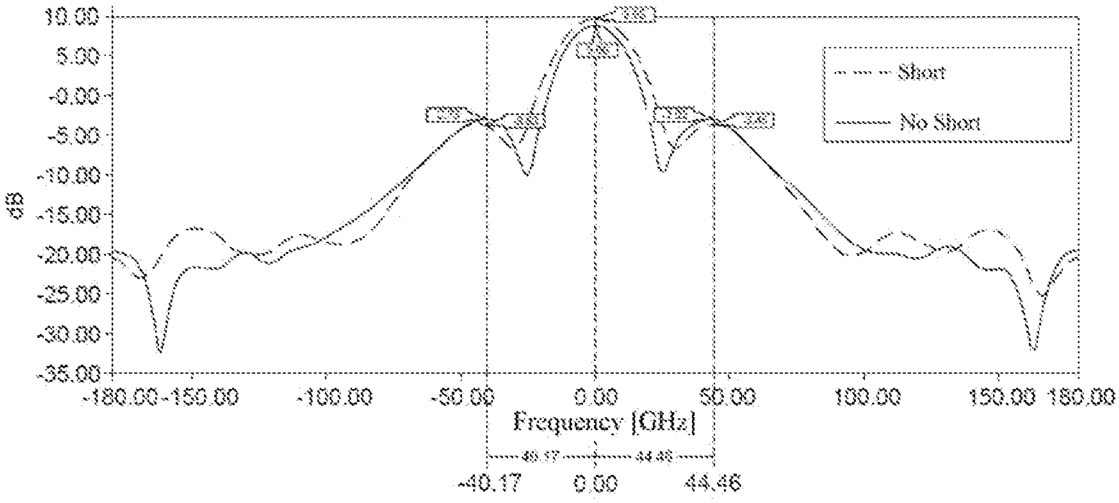
FIG. 6 is a 2D field pattern of ground microstrips short-circuited to the ground or not short-circuited to the ground according to a second embodiment of the present invention.

Referring to FIG. 6, tail ends of the radiating elements 4' are respectively connected to one ends of ground microstrips 5', and another ends of the ground microstrips 5' are short-circuited to the ground. The length of each ground microstrips 5' is adjustable according to the wavelength of the center frequency of the array antenna. In this embodiment, the length of the ground microstrip 5' is approximately one fourth (¼λg) (±20%) of the wavelength of the center frequency of the array antenna. Compared with the radiating elements 4' of the parallel antenna 7 without the ground microstrips 5' short-circuited to the ground, center frequencies of the array antenna are shifted by 0.89 GHz towards higher frequencies, and sidelobes are reduced by a range of 0.43-0.9 dB when the length of the ground microstrip 5' short-circuited to the ground is 0.25 λg.

Figure 7:
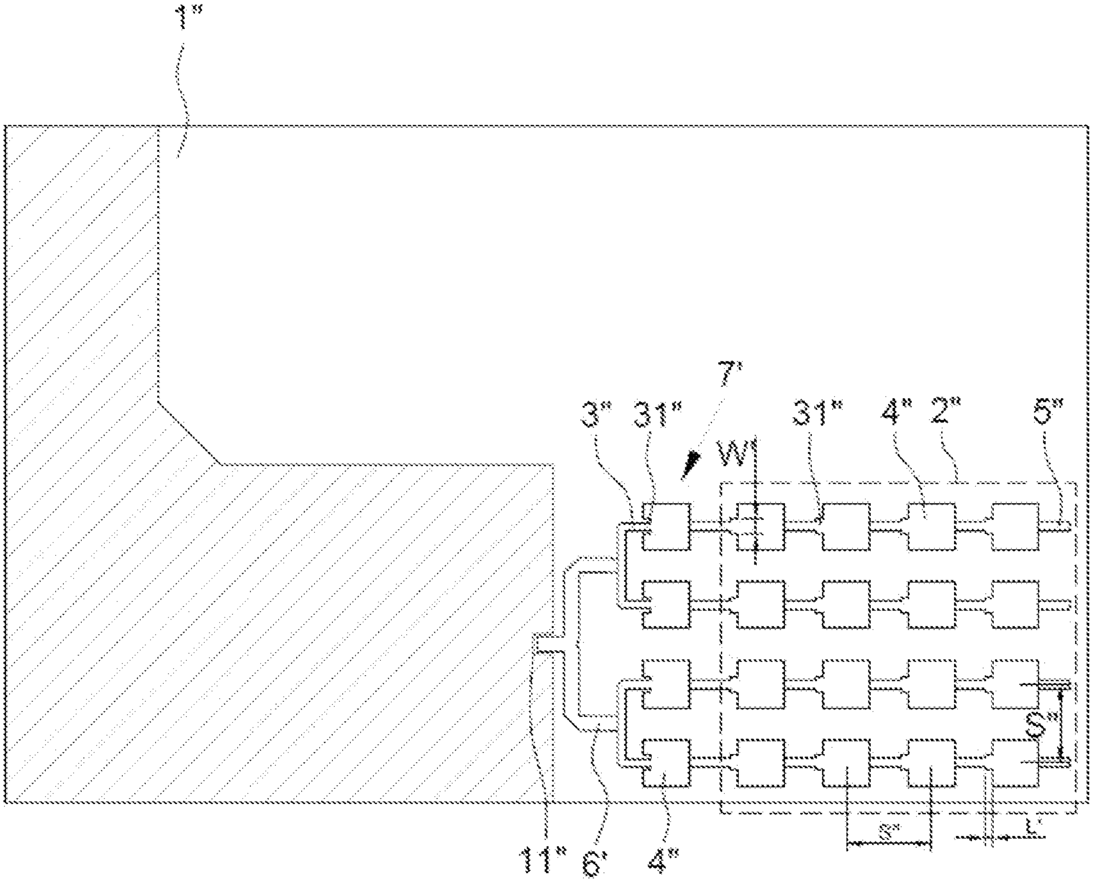
FIG. 7 is an architecture diagram of a serial-parallel antenna of a third embodiment of an array antenna according to the present invention.

Referring to FIG. 7, the third embodiment of an array antenna according to the present invention. The array antenna includes a flexible substrate 1", a power splitter 6', and a parallel antenna 7'. The power splitter 6' and the parallel antenna 7' are both arranged on the flexible substrate 1". In this embodiment, the array antenna is in a series-parallel configuration.

The flexible substrate 1" is formed by stacked LCP layers and has at least one feed point 11". In this embodiment, the quantity of the plurality of LCP layers is at least three.

The power splitter 6' is arranged on the flexible substrate 1". The power splitter 6' extends from the feed point 11" and splits into a plurality of branch feeders.

The parallel antenna 7' is arranged on the flexible substrate 1". The parallel antenna 7' includes a plurality of radiating elements 4" respectively connected to branch feeders of the corresponding power splitter 6' by microstrips 3". The microstrips 3" are respectively extended to connect the radiating elements 4" in series to form a serial antenna 2'.

In this embodiment, the length of each of the radiating elements 4" of the serial antenna 2' is approximately half (½λg) (±20%) of the wavelength of the center frequency of the array antenna, and the distance S" between centers of two adjacent radiating elements 4" is approximately equal to the wavelength (λg) of the center frequency of the array antenna, and the wavelength of the center frequency of the array antenna may be 7.2 mm. In addition, each of the radiating elements 4" is a rectangular metal, or may be in other shapes such as square, circle, oval . . . etc. and not limited thereto.

Moreover, the feeding section 31" formed in the radiating element 4" in the parallel antenna 7' is in the shape of a groove. Another feeding section 31" formed on the microstrips 3" feeding each of the radiating elements 4" by each of the first microstrips 3" in the serial antenna 2' is in a horn shape. The width W of the horn shaped feeding section 31" is greater than the width of the microstrip 3", and the length L' of the horn shaped feeding section 31" is adjustable. The adjusted lengths of the lengths L' may be all the same, partly the same, or all different.

The tail end one of the radiating elements 4" in the serial antenna 2' farthest from the feed point 11" is connected to one end of the ground microstrip 5", and another end of the ground microstrip 5" is short-circuited to the ground. The length of the ground microstrip 5" is adjustable according to the wavelength of the center frequency of the array antenna. In this embodiment, the length of the ground microstrip 5" is approximately one fourth (¼λg) (±20%) of the wavelength of the center frequency of the array antenna.

Figure 8:
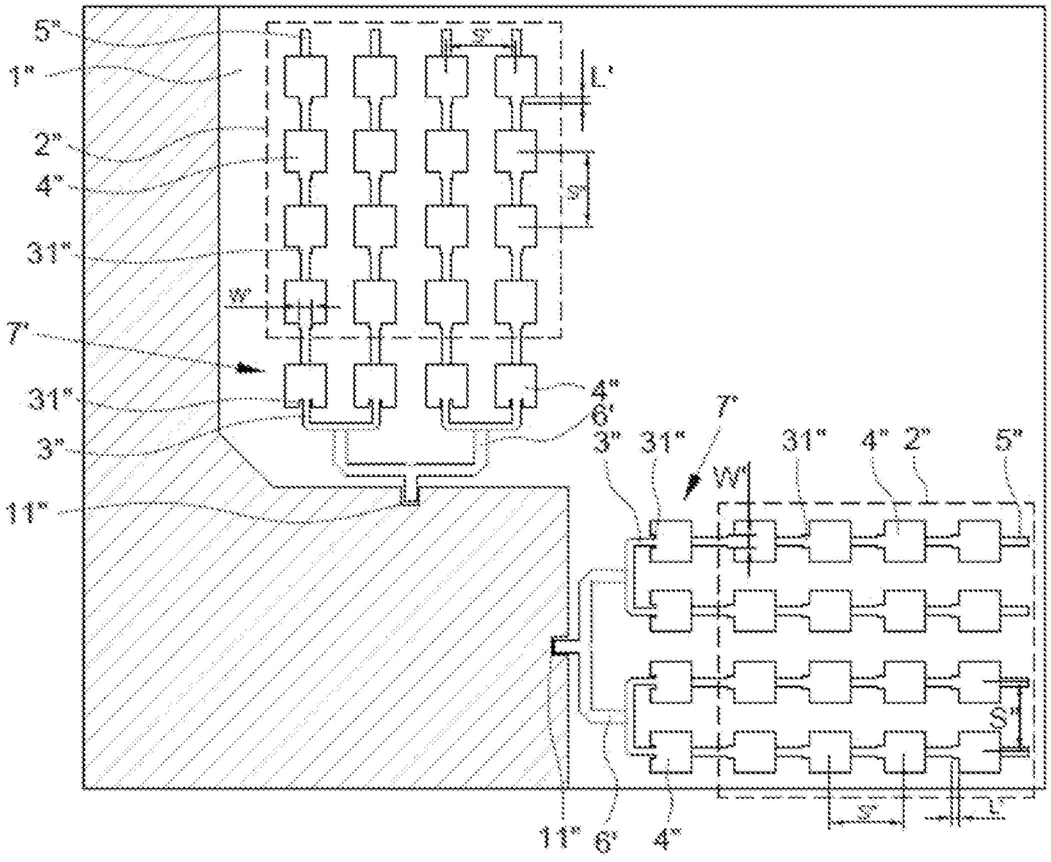
FIG. 8 is an architecture diagram of an antenna of a fourth embodiment of an array antenna according to the present invention.

Referring to FIG. 8, another embodiment where two sets of feed points 11", two sets of power splitters 6', and two sets of parallel antennas 7' are arranged to form two sets of series- and parallel-array antennas configured as an antenna transmitting terminal and an antenna receiving terminal respectively. The antenna transmitting terminal and the antenna receiving terminal are placed perpendicular to each other, so that the length of a transmission line is shorten and the loss is reduced.

In this embodiment, the other ends of the ground microstrip line are short-circuited to the ground, and the length of the ground microstrip is approximately equal to one fourth (¼λg) of the wavelength of the center frequency of the array antenna. Such embodiment according to the present invention can effectively reduce the sidelobes of the array antenna.

The above embodiments exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall fall within the scope of the claims below.

What is claimed is:

1. An array antenna, comprising:

a flexible substrate, formed by a plurality of stacked liquid crystal polymer (LCP) layers and having at least one feed point; and at least one serial antenna, arranged on the flexible substrate and formed by a microstrip extending from the feed point and connecting a plurality of radiating elements in series, wherein the radiating element in the serial antenna farthest from the feed point is connected to one end of a ground microstrip, another end of the ground microstrip is short-circuited to the ground, and a length of the ground microstrip is approximately one fourth of a wavelength of a center frequency of the array antenna.

2. The array antenna of claim 1, wherein a horn shaped feeding section is arranged on the microstrip connecting each radiating element of the serial antenna, and a width of the feeding section is greater than that of the microstrip in the serial antenna.

3. The array antenna of claim 1, wherein the length of each feeding sections is adjustable for changing the bandwidth and the center frequency of the array antenna.

4. The array antenna of claim 1, wherein a distance between centers of two adjacent radiating elements is approximately equal to the wavelength of the center frequency of the array antenna.

5. The array antenna of claim 1, wherein a length of each radiating elements in the direction of the microstrips is approximately half of the wavelength of the center frequency of the array antenna.

6. An array antenna, comprising:

a flexible substrate, formed by a plurality of stacked liquid crystal polymer (LCP) layers and having at least one feed point;

at least one power splitter, arranged on the flexible substrate, extended from the feed point and split into a plurality of branch feeders; and at least one parallel antenna, arranged on the flexible substrate, and including a plurality of radiating elements respectively connected to the corresponding branch feeders by microstrips, wherein tail ends of the radiating elements are respectively connected to one ends of ground microstrips, another ends of the ground microstrips are short-circuited to the ground, and a length of each of the ground microstrips is approximately one fourth of a wavelength of a center frequency of the array antenna.

7. The array antenna of claim 6, wherein a groove shaped feeding section is arranged in each radiating element where the microstrip feeds each radiating element of the parallel antenna.

8. The array antenna of claim 6, wherein the length of each feeding sections is adjustable for changing the bandwidth and the center frequency of the array antenna.

9. The array antenna of claim 6, wherein a distance between centers of two adjacent radiating elements is approximately equal to the wavelength of the center frequency of the array antenna.

10. The array antenna of claim 6, wherein a length of each radiating elements in the direction of the microstrips is approximately half of the wavelength of the center frequency of the array antenna.

11. An array antenna, comprising:

a flexible substrate, formed by a plurality of stacked liquid crystal polymer (LCP) layers and having at least one feed point;

at least one power splitter, arranged on the flexible substrate and extended from the feed point, and split into a plurality of branch feeders; and at least one parallel antenna, arranged on the flexible substrate and including a plurality of radiating elements respectively connected to the corresponding branch feeders by microstrips, wherein the microstrip of each branch feeder respectively extends to connect a plurality of radiating elements in series to form a serial antenna, one tail end of the radiating element farthest from the feed point is connected to one end of a ground microstrip, another end of the ground microstrip is short-circuited to the ground, and a length of each of the ground microstrips is approximately one fourth of a wavelength of a center frequency of the array antenna.

12. The array antenna of claim 11, wherein a horn shaped feeding section is arranged on the microstrip connecting each radiating element of the serial antenna, and a width of the feeding section is greater than that of the microstrip in the serial antenna.

13. The array antenna of claim 11, wherein a groove shaped feeding section is arranged in each radiating element where the microstrip feeds each radiating element of the parallel antenna.

14. The array antenna of claim 11, wherein the length of each feeding sections is adjustable for changing the bandwidth and the center frequency of the array antenna.

15. The array antenna of claim 11, wherein a distance between centers of two adjacent radiating elements is approximately equal to the wavelength of the center frequency of the array antenna.

16. The array antenna of claim 11, wherein a length of each radiating elements in the direction of the microstrips is approximately half of the wavelength of the center frequency of the array antenna.

17. The array antenna of claim 11, wherein two sets of array antennas are substantially perpendicular to each other when used simultaneously.

18. The array antenna of claim 11, wherein feeding sections formed in the microstrips connecting to radiating elements have different lengths.

* * * * *